(12) United States Patent
Ross

(10) Patent No.: US 8,754,801 B1
(45) Date of Patent: Jun. 17, 2014

(54) ANTI-JAM APPARATUS FOR BASEBAND RADAR SYSTEMS

(75) Inventor: Gerald F. Ross, Lexington, MA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 05/845,984

(22) Filed: Oct. 27, 1977

(51) Int. Cl.
  *G01S 7/36* (2006.01)
  *G01S 7/02* (2006.01)
  *G01S 13/02* (2006.01)

(52) U.S. Cl.
  CPC .............. *G01S 7/021* (2013.01); *G01S 13/0209* (2013.01)
  USPC .............................................. 342/16; 342/21

(58) Field of Classification Search
  CPC ......... G01S 13/0209; G01S 7/34; G01S 7/36; G01S 7/021; H01P 5/12
  USPC .............. 343/18 E; 342/16–19, 21; 333/73 R, 333/73 W, 73 S, 81 R, 81 B
  See application file for complete search history.

(56) References Cited

U.S. PATENT DOCUMENTS

| | | | | |
|---|---|---|---|---|
| 3,579,148 A | * | 5/1971 | Blume | 333/114 |
| 3,646,478 A | * | 2/1972 | Ross | 307/106 |
| 3,681,656 A | * | 8/1972 | Mitchell | 315/223 |
| 3,736,504 A | * | 5/1973 | Koide et al. | 324/74 |
| 3,750,125 A | * | 7/1973 | Ross et al. | 340/561 |
| 3,801,976 A | * | 4/1974 | Ross et al. | 340/561 |
| 3,858,205 A | * | 12/1974 | Ross | 342/21 |
| 3,866,152 A | * | 2/1975 | Ross | 333/20 |
| 3,934,252 A | * | 1/1976 | Ross et al. | 342/21 |
| 4,084,128 A | * | 4/1978 | Ames et al. | 329/307 |
| 6,133,865 A | * | 10/2000 | Alpers | 342/13 |
| 6,518,912 B1 | * | 2/2003 | Dick et al. | 342/13 |

* cited by examiner

*Primary Examiner* — John B Sotomayor
(74) *Attorney, Agent, or Firm* — Robert P. Marley

(57) ABSTRACT

A filter which highly attenuates CW signals within specified frequency bands while allowing baseband pulses to pass therethrough with relatively low attenuation is provided. The filter comprises a main transmission line and stub transmission lines that are coupled in parallel relationship with the main transmission line. Each of the stub transmission lines is terminated with a short circuit or other appropriate impedance and is of such a length that a pulse coupled thereto from the main transmission line and reflected from the terminating impedance will arrive at the coupling plane with the main transmission line after the pulse propagating on the main transmission line has completely passed the coupling plane, thus eliminating the possibility of cancellation of any portion of the propagating pulse. The length, spacing and terminating impedance of each of the stub transmission lines is selected to provide stop bands for CW signals so that a pulse is coupled to the output terminals of the filter that is substantially free of CW interfering signals that may exist at the input terminals thereof.

7 Claims, 2 Drawing Sheets

ANTI-JAM APPARATUS FOR BASEBAND RADAR SYSTEMS

BACKGROUND OF THE INVENTION

1. Field of the Invention

The present invention relates to baseband radar systems, and more particularly, to means for minimizing the susceptibility of such systems to CW and narrow band jamming.

2. Description of the Prior Art

Radar systems utilizing subnanosecond substantially baseband pulses have a wide range of military applications, one of which is as a range sensor in a proximity fuse wherein range resolution and accuracy are of prime importance. These devices, however, though insensitive to multiple target deception and broadband noise jammers because of receiver range gates that are only a few nanoseconds wide, are vulnerable to electronic countermeasures (ECM) such as CW or narrow band jammers operating at frequencies which are of the order of the reciprocal of the substantially baseband pulse. Incident signals of CW jammers in this range present a multiplicity of half cycles within a range gate which appear as baseband pulses to the system's receiver thus providing an opportunity for the jamming signal to exceed the system threshold with each cycle. If a baseband radar system were employed as a terminal altitude sensing device for a free falling bomb, a CW jamming signal could cause the bomb to prematurely explode thus reducing the effectiveness of the weapon. Providing a narrow range gate to reduce the probability of false alarms with each cycle of CW signal concomitantly requires a moving range gate to cover the desired over-all range, thus adding an undesired complexity. To utilize the inherent range resolution and accuracy of baseband radar systems, a means for minimizing its susceptibility to CW, and narrow band jamming is required.

SUMMARY OF THE INVENTION

An anti-jam device for a baseband radar system constructed according to the principles of the present invention includes a main transmission line coupled between the baseband receiving antenna and the baseband receiver and a multiplicity of short-circuited stub transmission lines coupled in parallel relationship to the main transmission line with a preselected distance along the main transmission line therebetween. Each of the stub transmission lines is of a length that is a multiple of a half wavelength of a desired resonant frequency and in combination provides a desired frequency stop band in the steady state operating condition. A baseband pulse coupled to the main transmission line is a transient thereon and propagates to the input terminals of the receiver while experiencing attenuation caused only by the reflection coefficients at the coupling plane between the main transmission line and each of the stub transmission lines. With this configuration CW signals propagating along the main transmission line are greatly attenuated while a baseband pulse propagating thereon are only partially attenuated.

DESCRIPTION OF THE PREFERRED EMBODIMENTS

All networks provide transient and steady state responses to applied signals, which together constitute the total response thereto. When a CW signal is initially applied to a quiescent linear, time invariant network, the change from no signal to signal elicits a transient response. This transient response decays to substantial extinction after a time lapse determined by the network parameters, from the initial signal application and the network steady state response is obtained thereafter. A substantially baseband pulse, with a duration in the order of a nanosecond exhibits such a rapid change of state that when it is applied to a network only the transient response is elicited.

Figure 1:
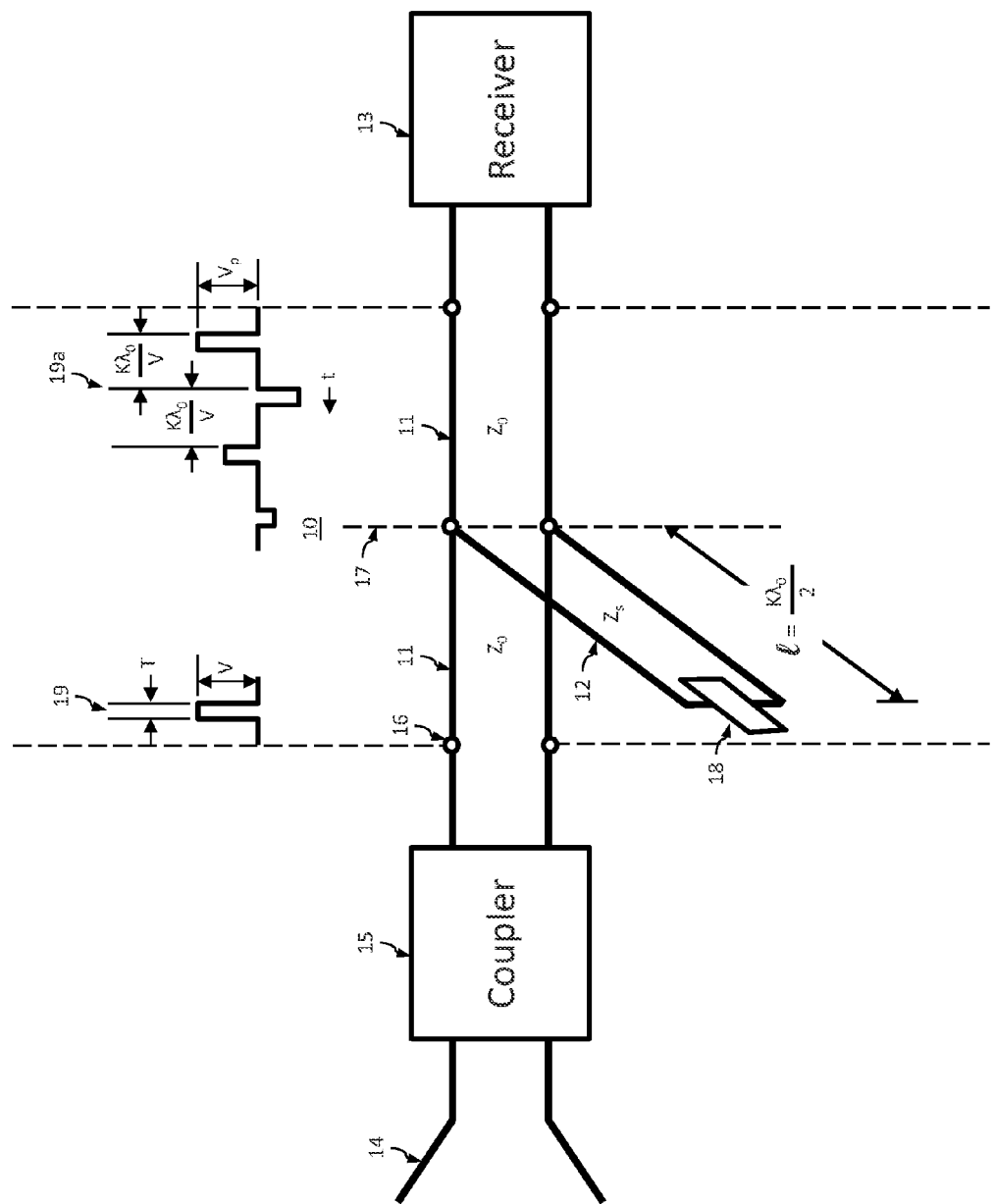
FIG. 1 is a schematic diagram of an embodiment of the antenna wherein a single short-circuited stub transmission line is employed.

Refer now to FIG. 1, wherein an anti-jam filter 10 it comprising a main transmission line 11, having characteristic impedance $z_o$, and a stub transmission line 12, having characteristic impedance $z_s$, is shown coupled between a baseband receiver 13 and a baseband receiving antenna 14 which may be directly coupled to the anti-jam filter 10 or via a coupling element 15. Signals received by antenna 14 are coupled at terminal 16 to the main transmission line 11 and propagate thereon to the coupling plane 17 whereat the stub transmission line 12 is coupled in parallel relationship with the main transmission line 11. Clearly, if the stub transmission line 12 is substantially lossless and terminated with a short circuit 18 at a distance from the coupling plane that is equal to integer multiples k of a half wavelength $$\frac{(\lambda_o)}{2}$$

of a received CW jamming signal, a short circuit to the CW jamming signal will appear at the coupling plane 17.

A received baseband pulse 19 with voltage amplitude $V_{inc}$ incident to the coupling plane 17 will initially see an impedance thereat that is equal to the parallel combination of $z_o$ and $z_s$. This impedance gives rise to a reflection coefficient:

$$\Gamma = \frac{z_s - z_o}{z_s + z_o}$$

thus establishing a voltage $$v_p = v_{inc}(1 + \Gamma)$$

at the coupling plane 17 which propagates therefrom along the main transmission line 11 and the stub transmission line 12. The signal propagating along the stub transmission line 12 will be reflected from the short circuit termination thereon, and returned to the coupling plane 17 with substantially equal amplitude and opposite polarity to $V_{inc}$. The multiplicative factor k, which determines the length of the stub transmission line, is chosen to satisfy the inequality $$k > Tf_o,$$

so that $$\frac{2\ell}{v},$$

the return trip transit time, is greater than T; $\ell$ being the length of the stub transmission line 12, v the velocity of propagation thereon, and T the width of the baseband pulse. This line length selection causes the reflected baseband pulse to arrive at the coupling plane after the pulse propagating along the main transmission line 11 has completely passed thereby. Since the reflected pulse on the stub transmission line 12 and the propagating pulse on the main transmission line 11 do not coalesce, no cancellation of the pulse propagating along the main transmission line is realized as a result of the reflected pulse from the stub transmission line 12. A portion of the reflected pulse is reflected from the coupling plane 17 back along the stub transmission line 12 to be reflected again from the short circuited termination back to the coupling plane 17. These multiple reflections cause a pulse train 19a, characterized by pulses of diminishing amplitude and alternating phase spaced $$\frac{k}{f_o}$$

apart, to propagate along the main transmission line towards the baseband receiver 13. Since the short circuited stub transmission line of length $$\frac{k\lambda_o}{2}$$

presents a short circuit at the coupling plane 17 to a steady state CW jamming signal at frequency $f_o$, the baseband receiver receives the pulse train 19a free of interference. Baseband receiver 13 may be designed to respond only to the leading pulse of the pulse train 19a.

Figure 2:
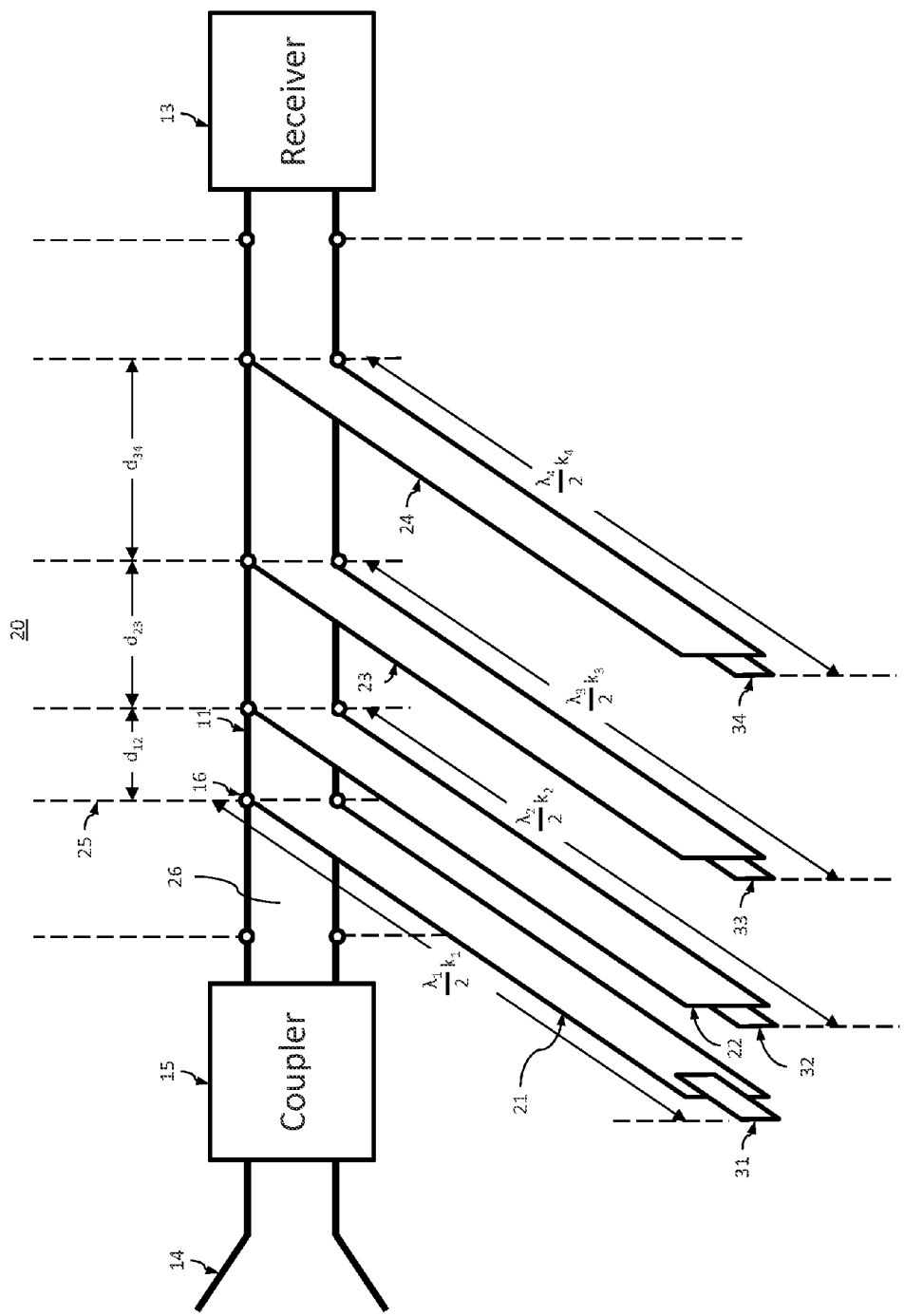
FIG. 2 is a schematic diagram of an embodiment of the invention wherein a multiplicity of short circuited stub transmission lines are employed.

The embodiment of the invention described above provides cancellation of CW jamming signals over a relatively narrow band of frequencies centered about $f_o$. A filter may be designed to provide a multiplicity of such stop bands by providing stubs that are multiples of a half wavelength of the center frequency signal of each of the selected stop bands. The performance of this filter may be further enhanced by positioning each stub transmission line an odd number of quarter wavelengths of its center frequency signal from a preceding stub transmission line. Refer now to FIG. 2, wherein a filter 20 comprising a multiplicity of stub transmission lines 21, 22, 23 and 24 is shown coupled between the baseband receiver 13 and the baseband receiving antenna 14. Each of the short circuited stub transmission lines 21 through 24 is of a length that is equal to a multiple of one-half the wavelength of a signal at the center frequency of a desired stop band. As previously discussed, the multiplicative integer $k_n$ of the $n^{th}$ transmission line must obey the inequality $k_n > Tf_n$. When the interstub spacing $d_{12}$ between stub transmission lines 21 and 22 is equal to an odd multiple of a quarter wavelength of the signal at the center frequency of the stop band created by the short circuited stub transmission line 22, an open circuit to signals at this frequency is created at the coupling plane 25 at which the short circuited stub transmission line 21, preceding the short circuited stub transmission line 22, is coupled to the main transmission line 26, thus providing for greater cancellation of a CW jamming signal having a wavelength equal to $\lambda_2$.

This performance enhancement may also be accomplished for the short circuited stubs 23 and 24 by positioning short circuited stub 23 from the short circuited stub 22 by a distance $d_{23}$ that is equal to a quarter wavelength of the signal at the center frequency of the stop band created by short circuited stub 23 and by positioning short circuited stub 24 a distance $d_{34}$ from the short circuited stub 23 that is equal to a quarter wavelength of the signal at the center frequency of the stop band created by the short circuited stub 24.

The $i^{th}$ stub transmission line, with characteristic impedance $z_{si}$ causes a reflection coefficient $$\Gamma_i = \frac{z_{si} - z_o}{z_{si} + z_o}$$

at its coupling plane with the main transmission line 26. When n such transmission lines are employed the leading pulse of the pulse train arriving at the receiver 13 is related to the incident pulse by $$v_p = \frac{n}{\pi}(1 + \Gamma_i).$$

Though a system having a main transmission line with equal interstub characteristic impedances has been described, it will be apparent to those skilled in the art that a main transmission may be employed for which the interstub characteristic impedances are not equal. It will also be apparent to those skilled in the art that the interstub characteristic impedances of the main transmission line and the stub transmission lines may be chosen to minimize the reduction of the received pulse amplitude.

The terminations 31 through 34 on the stub transmission lines 21 through 24, respectively, need not necessarily be short circuits. These terminations may be selected to provide a lower Q for the terminated stub transmission line thus broadening the stop band but at the expense of reducing the attenuation of signals at frequencies within the broader stop band. It should be apparent to those skilled in the art that a continuous stop band filter over a preselected frequency range may be constructed in accordance with the principles of this invention by utilizing a series of properly spaced and properly terminated stub transmission lines coupled in parallel relation with a main transmission line.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An apparatus for attenuating CW signals within at least one specified frequency band while allowing substantially baseband pulse signals to propagate therethrough with relatively little attenuation comprising:
   a main transmission line along which said CW and substantially baseband signals propagate; and
   at least one stub transmission line each of a predetermined length, characteristic impedance and terminated with a preselected impedance coupled in parallel relationship to said main transmission line with predetermined spacing therebetween, said predetermined length and said preselected impedance dependent upon said specified frequency band and said predetermined length being such that a baseband pulse initially coupled thereto from said main transmission line and reflected from said preselected impedance is returned to said main transmission line after an elapsed time, from said initial coupling, that exceeds the duration of said substantially baseband pulse.

2. An apparatus in accordance with claim 1 wherein said predetermined lengths are substantially equal to a multiple of a half wave length of a signal within said specified frequency band.

3. An apparatus in accordance with claim 2 wherein said terminating impedance is substantially a short circuit.

4. An apparatus in accordance with claim 2 wherein said at least one stub transmission lines are spaced such that one of said at least one stub transmission lines of length substantially equal to a multiple of a half wavelength of a signal at a frequency within a specified frequency band for said one stub transmission line is located substantially an odd multiple of a quarter wavelength of said signal from the preceding stub transmission line.

5. An apparatus in accordance with claim 4 wherein each of said at least one stub transmission lines is terminated with an impedance that is substantially a short circuit.

6. An apparatus in accordance with claim 1 wherein said predetermined length, said predetermined spacing, said characteristic impedances, and said preselected terminating impedances of said at least one stub transmission lines are such that a continuous stop band for CW signals between a first specified frequency and a second specified frequency is provided.

7. An apparatus in accordance with claim 6 wherein the characteristic impedances of said main transmission line in the intervals of said predetermined spacing between said stub transmission lines are not equal.

* * * * *